United States Patent [19]
Arons et al.

[11] 3,983,195
[45] Sept. 28, 1976

[54] PENCIL SHEATH COMPOSITIONS, METHOD FOR MAKING PENCILS

[75] Inventors: Irving J. Arons, Peabody; Robert Eller, Boston; Richard E. Merrill, Wakefield, all of Mass.

[73] Assignee: Hasbro Industries, Inc., Pawtucket, R.I.

[22] Filed: Oct. 29, 1974

[21] Appl. No.: 518,879

Related U.S. Application Data

[60] Division of Ser. No. 348,664, April 6, 1973, Pat. No. 3,875,088, which is a continuation-in-part of Ser. No. 163,303, July 16, 1971, abandoned.

[52] U.S. Cl. ............................ 264/45.3; 264/45.9; 264/46.9; 264/149; 264/174; 264/237; 264/271; 264/DIG. 5; 264/DIG. 14

[51] Int. Cl.² ..................... B29D 27/00; B29F 3/10; B43K 19/14

[58] Field of Search ............ 264/148, 149, 172, 174, 264/176 R, 271 L, 45.3, 45.9, 46.9, 237, DIG. 5, DIG. 14; 401/96

[56] References Cited
UNITED STATES PATENTS

| | | | |
|---|---|---|---|
| 1,937,104 | 11/1933 | Thomsen | 264/149 |
| 2,408,398 | 10/1946 | Johnson | 264/174 |
| 2,790,202 | 4/1957 | Lorenian | 264/172 |
| 2,988,784 | 6/1961 | Lorenian | 401/96 |
| 3,704,071 | 11/1972 | Muller et al. | 401/96 |

FOREIGN PATENTS OR APPLICATIONS

| | | | |
|---|---|---|---|
| 154,937 | 1/1954 | Australia | 401/96 |
| 2,055,894 | 4/1971 | France | 401/96 |

*Primary Examiner*—Allan Lieberman
*Attorney, Agent, or Firm*—Shapiro and Shapiro

[57] ABSTRACT

Pencils made with a resin-based sheath to replace wood sheaths. A sheath material consisting essentially of a resin binder, a fibrous filler and a metallic soap is extruded around a marking core. The resulting extrudate is immediately chilled after leaving the die, and cut into pencil lengths. The apparatus includes core feeding and transport means, core preheating means and chilling means. The resulting pencils possess the physical qualities associated with wood-sheathed pencils due to the fine, closed cell structure of the sheath material. The surface of the sheath is smooth and may be coated with a pigmented resin or painted.

7 Claims, 18 Drawing Figures

PENCIL SHEATH COMPOSITIONS, METHOD FOR MAKING PENCILS

This application is a division of application Ser. No. 348,664; filed Apr. 6, 1973, now U.S. Pat. No. 3,875,088; Apr. 1, 1975, which application is a continuation-in-part of application Ser. No. 163,303; filed July 16, 1971, now abandoned.

The invention relates to pencil manufacture, and is more particularly directed to the manufacture of pencils having an extruded, synthetic resin-based sheath.

BACKGROUND OF THE INVENTION

Pencils are normally formed by enclosing the marking core in wooden sheaths. The wood used must meet certain physical standards of strength, dimensional stability and sharpenability. The present commercial process for making pencils is a multistep one, time consuming and relatively expensive. Substitutes for the wooden sheaths as well as for the involved manufacturing process have long been sought. It is, however, difficult to form a sheath material which is satisfactorily bonded to the marking core, and which the user will accept as a substitute for the well-known wood sheath. This is due to the fact that the sheath must meet certain desired criteria including sharpenability, adequate stiffness, good flexural or breaking strength, relatively low density and bondability to the marking core.

Many attempts have been made to manufacture pencil sheaths from a material other than wood. It has been proposed to manufacture pencil sheaths by extrusion and subsequent drying of an aqueous pulp of wood or paper with a suitable binder, or to tightly wrap the marking core with paper and the like. In the first instance, such attempts have been unsuccessful because the necessity of expelling large amounts of water from the extrudate gives rise to warped pencils and loose cores. Where pencils have been made by wrapping the core, problems have arisen in adhering the wrapping material to the core, as well as adhering the layers of wrapping material to each other, and in producing a straight, properly aligned sheath that couled be readily sharpened by a penknife or mechanical sharpening device.

U.S. Pat. Nos. 2,988,784 and 2,790,202 disclose a sheath composition, a method, and an apparatus for extruding a sheath around a marking core to make a so-called scissible writing instrument. The sheath composition disclosed is a mixture of a main ingredient (wood flour and the like), a waxy substance such as chlorinated naphthalene, a thermoplastic binder such as polyvinyl chloride, a plasticizer for the binder, and a lubricant. The sheath composition is blended and used in a completely dry condition, this being the patentee's way of avoiding the difficulties encountered in the prior art compositions and methods.

In the method and apparatus of U.S. Pat. No. 2,790,202, techniques and means are used to extrude the sheath around leads fed along a vertically-oriented axis. Cooling of the sheath is accomplished before the sheathed lead leaves the die nozzle.

The composition, method and apparatus of U.S. Pat. Nos. 2,988,784 and 2,790,202 present certain inherent difficulties and limitations. Among such difficulties are the need for working with completely dry sheath material, the need for using an adhesive to bond the core to the sheath, and the necessity to accurately control the radial component of pressure in relation to the axial component of pressure on the sheath material to overcome the back pressure in the die brought about through the vertical feeding of abutting core lengths. To the best of applicants' knowledge, this prior art teaching which overcomes some of the disadvantages and limitations of the art preceding it has a number of limitations of its own, which have apparently prevented it from achieving any commercial success.

SUMMARY OF THE INVENTION

It is an object of this invention to provide a novel and improved composition which can be extruded around a marking core to form the sheath of a pencil. It is another object to provide a composition which may be extruded at temperatures lower than usually employed, and which is directly bondable to the marking core, thereby eliminating the need for an adhesive. It is still another object to provide such a sheath composition which when extruded and cooled is made up of fine cells imparting to the sheath good sharpenability and a smooth, denser outer surface which readily lends itself to the application of a colored coating.

It is another object of the invention to provide an improved pencil the sheath of which is formed of a thermoplastic material and possesses the characteristics of sharpenability, adequate stiffness, adequate flexural or breaking strength, low density, and bondability to the marking core associated with wood-sheathed pencils.

It is a further object of this invention to provide an improved method of forming pencils in the form of a thermoplastic sheath extruded around and directly bonded to a marking core. It is another object to provide a method of the character described which is continuous in operation and produces pencils having the physical characteristics of wood-sheathed pencils.

It is still another object to provide improved apparatus for using the composition of the invention, and to carry out the method of the invention to produce improved thermoplastic resin sheathed pencils.

The composition of the invention which is extruded around the marking core to form the sheath of the pencil consists essentially of, by weight, approximately 50 to 75% of a thermoplastic resin binder, approximately 20 to 40% of a fibrous filler, and approximately 0.5 to 15% of a metallic soap. The ratio of binder to fibrous filler is approximately 1.5 to 3.0. To furnish the desired fine, closed cell structure for the sheath, the composition contains 0.3 to 2%, by weight, of moisture. Preferably, the moisture content is 0.8 to 1%.

By the method of the invention, pencils are made by formulating the sheath composition material, controlling the moisture content thereof, extruding it hot onto marking cores which are preheated to facilitate bonding to the sheath material, and then rapidly chilling the resulting extrudate comprising the marking core axially aligned within the sheath. After a final cooling, the extrudate is cut into the desired pencil lengths. Subsequent to the formation of the sheath around the core but prior to the withdrawal of the extrudate from the die, the sheath surface may be, and preferably is, coated with a pigmented thermoplastic coating by extruding a coating composition onto it. Alternatively, the extrudate may be painted in the same manner as wood-sheathed pencils.

The apparatus of this invention comprises a crosshead and die assembly adapted to extrude a softened or fused resin-based material around a marking core, means to feed the core material, in the form of abutting lengths, into the crosshead and die assembly, means to preheat the core lengths prior to their introduction into the crosshead and die assembly, means to provide the sheath forming material as a fused resinbased material into the crosshead and die assembly, means to rapidly chill the extrudate sheath containing the core and then to further cool it, and means to withdraw the extrudate from the die. Means may also be provided for extruding a resin coating over the extruded sheath before the extrudate leaves the die, and to cut the extrudate into predetermined lengths.

The resulting pencil is characterized by good sharpenability, accurate alignment of the core within the sheath and tightly bonded thereto, a smooth pleasing surface, and completely adequate strength. Examination of the sheath material shows it to be in the form of fine, closed, uniformly sized cells, believed to be the result of a small, but critical amount of moisture present in the sheath forming material prior to extrusion. The size of these fine closed cells decreases radially from the core out to the pencil's surface, producing a concomitant increase in density radially outward to provide a smooth exterior surface. It may be postulated that this in turn is due to the rapid chilling of the extrudate after it leaves the die nozzle.

These, and other objects and advantages of the invention will be apparent from the following detailed description taken in conjunction with the drawings.

DESCRIPTION OF THE PREFERRED EMBODIMENTS

The invention will now be described in greater detail with regard to the composition and formulation of the sheath material, the method of using the sheath material to form pencils, the apparatus used to carry out the method, and the resulting article of manufacture.

Composition of the Sheath Material

The sheath material consists essentially of a thermoplastic resin binder, a fibrous filler and a metallic soap. Each of these essential components is believed to serve several purposes in creating a good sheath.

The thermoplastic resin functions as a binder for the filler, to enhance the extrudability of the sheath at relatively low temperatures, and to contribute to the ease of fabrication to give a sharpenable, low-stretch, substantially rigid sheath.

Since no adhesive need be used, the resin binder is capable of providing a suitable bond to the marking core; and also preferably, the sheath is capable of providing a base for the bonding thereto of a coating material. Thermoplastic, extrudable grade resins suitable as a component of the sheath material include, but are not limited to, styrene-acrylonitrile resins, acrylonitrile-butadiene-styrene resins, rubber-modified impact polystyrene resins, ethyl cellulose and the cellulose ester resins (e.g., cellulose acetate, cellulose butyrate and cellulose propionate), homopolymers and copolymers of the vinyl resins and the like. A preferred thermoplastic resin is an acrylonitrile-butadiene-styrene resin having a Vicat softening point of 212°F and a specific gravity of 1.05. In general, the Vicat softening point of the resin is preferably above about 180°F.

The amount of the thermoplastic resin binder may range between approximately 50 and 75% by composition weight, with approximately 65 to 70% preferred.

The fibrous filler performs the multiple functions of serving as a reinforcing filler to increase rigidity and flexural strength, enhancing the sharpenability of the final pencil, and as the source of the moisture required in the formation of the fine cellular structure attained and responsible for the good sharpenability and low density.

Suitable fillers are preferably cellulosic in nature, but such fillers as micronized leather may also be used. Cellulosic fillers which may be used include, but are not limited to, such comminuted materials as softwood flour, cotton linters, chopped or hammermilled rayons, hardwood flours, walnut shell flour, peanut shell flour, pecan shell flour, sisal fibers, cotton flock, wood pulp and mixtures thereof. A preferred filler material is a softwood flour sized such that 96 to 98% passes through a 100-mesh screen, e.g., of a particle size of about 150 microns and less. Wood flours between 200 and 40-mesh size, e.g., between about 75 and 425 microns may be used. The filler should be present in an amount ranging between approximately 20 to 40%, by weight, of the sheath composition.

The metallic soap functions as an extrusion aid to permit the use of lower than normal extrusion temperatures and acts as a lubricant to aid sharpenability. It appears to also contribute to the attainment of uniformity of cell formation and to the resulting desired cell structure in general.

The term "metallic soap" is used herein in the sense defined on pp. 195, vol. 5, 1950 edition and 573, vol. 12, 1954 edition of the Kirk-Othmer Encyclopedia of Chemical Technology. Metallic soaps contain a metal other than sodium or potassium, and are for the most part alkaline earth or heavy-metal salts of monobasic carboxylic acids of the general formula $(RCOO)_xM$, where M is a metal radical of valence state x and R is an organic radical containing at least 6–7 carbon atoms. While metallic soaps are insoluble in water, the term as herein used includes lithium salts which are moderately soluble. Examples of metallic soaps which are preferred are the stearates, oleates, palmitates, ricinoleates, and laurates of calcium, aluminum (mono-, di-, and tri-), magnesium, zinc, and lithium. Such metallic soaps are preferred because of their non-toxicity.

A preferred metallic soap is a micronized aluminum stearate having a melting point of between 150° and 155°C (about 300°F) and sized such that about 95% passes through a 200-mesh screen, e.g., of a particle size of about 75 microns or less. For uniform distribution, the metallic soap preferably is used in the form of a fine particulate material, and it must have a softening point below the temperature at which the sheath composition is extruded around the core.

The metallic soap is present in the sheath composition in a range between about 0.5 and about 15%, by weight, with a preferred range being between about 3 and 10% by weight.

To achieve the aforementioned desired criteria of sharperability, adequate stiffness, good flexural or breaking strength and bondability to the marking core coupled with the essential ability to extrude the composition about the core, the binder and fibrous filler must be present in the binder/filler ratio of 1.5 to 3.0. To extrude a composition having a binder/filler ratio of 1.5, it is desirable to use an amount of metallic soap at the higher end of the range indicated above, or approximately 15% by weight of the composition. It is preferred however, that the composition contain a binder/filler ratio which is on the high side of the range, or approximately 2.8. Such a composition provides a higher output rate, improved breaking strength and a superior surface finish.

Though not essential, it is within the scope of the invention to add other ingredients including coloring material in the form of dyes or pigments, scenting agents such as those giving an odor of cedar, and the like. These additional components are generally present in relatively small amounts, and are chosen to contribute any desired aesthetic qualities to the finished pencil.

A significant aspect of this invention is that the sheath has a fine, controlled size, closed-cell structure. In the normal extrusion of thermoplastic resins, it has always been considered essential to utilize a dry resin compound to avoid cell formation and to eliminate large closed voids in the extruded product. It has been found, however, contrary to this past practice, that if a small, but controlled amount of moisture is present in the sheath material as it is introduced into the extruder, it is possible to utilize the moisture for the formation of the desired cellular structure in the finished extruded sheath. The amount of moisture in the sheath composition is in the range of between about 0.3 and about 2%, by weight, with the preferred range being between about 0.8 and 1%. By controlling the moisture content of the sheath composition within this fairly narrow range and by using relatively low extrusion temperatures and high extrusion pressures, it is possible to control the cell size and distribution within the desired ranges.

Where the conditions are such that it is difficult to control the humidity conditions, or to allow less rigid control of moisture, a small amount of a blowing agent may be included in the sheath composition. Examples of suitable blowing agents which may be used are azodicarbonamide, 1,1′ -azobisformamide, p,p′ -oxybis (benzene sulfonyl semicarbazide), dinitrosopentamethylene tetramine, bis-benzenesulfonyl hydrazide, asobisisobutyronitrile, and sodium bicarbonate. The blowing agent may be present in the amount of 0 to 2.0%, the preferred range being 0.05 to 1.0% by weight of the total composition. If a blowing agent is used, the moisture content may be somewhat reduced without adversely affecting the uniform cellular structure of the extruded product.

As hereinbefore indicated, one of the functions of the metallic soap is that it acts as an extrusion aid. If desired, a small amount of an extrusion aid in addition to the metallic soap may be included in the sheath composition; for example, polyethylene, a hydrocarbon wax, a fatty acid ester, a fatty acid amide, or a fatty acid. If an added extrusion aid is included in the composition, it may be present in the amount of 0 to 5.0%, the preferred range being in the amount of 0.5 to 2.5%, by weight, of the total composition.

Since the fibrous fillers normally contain moisture (e.g., approximately 6% equilibrium moisture content in wood flour) the moisture is preferably introduced as an integral part of the filler, and then reduced to the desired level by heating. Alternatively to the compounding of sheath composition as a dry material, it may be mixed as a slurry and the water removed in an appropriate manner to the desired level.

In formulating the sheath composition, the fibrous filler and metallic soap are dry blended at room temperature in conventional blending equipment. Then this dry mixture, together with the thermoplastic binder are fed into a continuous-melt blender such as a Banbury or Farrell mixer. The blending temperature is maintained at a sufficiently high level to melt the resin binder without thermally degrading the filler or the resin. Subsequent to mixing and cooling, the product is granulated, brought to the desired equilibrium moisture content by adding or removing water and then sealed in an air-tight, moisture-impermeable container until used.

If desired, the resin binder may be in the form of a latex, whereupon it is added to the fibrous filler and mixed until the filler is uniformly distributed and thoroughly wetted out by the latex. Then the metallic soap is added and thoroughly blended in. The resulting slurry or wet paste is then dried in any suitable manner, such as by passing it several times through a two-roll mill heated to a temperature within the range specified for dry mixing to drive off excess water. This milling is continued until the composition forms a continuous band on one of the hot rolls. It is then removed and transferred to a heated blender for processing in the same manner as described for the relatively dry blends.

Sheath compositions were dry blended by the first described formulating procedure as follows:

| Component | Percent by Weight of Component Example Number | | | | | | | |
|---|---|---|---|---|---|---|---|---|
| | 1 | 2 | 3 | 4 | 5 | 6 | 7 | 8 |
| Resin Binder | | | | | | | | |
| Acrylonitrile-butadiene-styrene resin (1) | 70 | | | 70 | 65 | 57 | 54 | 51 |
| High-impact, rubber modified polystyrene (2) | | 70 | 70 | | | | | |
| Fibrous Filler | | | | | | | | |
| Wood flour (100-mesh) | 25 | 25 | | 27 | 25 | 38 | 36 | 34 |
| Wood flour (40-mesh) | | | 25 | | | | | |
| Metallic Soap | | | | | | | | |
| Aluminum Stearate | 5 | 5 | 5 | 3 | 10 | 5 | 10 | 15 |

(1) Sold as ABS 213 by Dow Chemical Company: Vicat softening point 212°F, specific gravity 1.05; melt flow rate 6.8 gm/10 min.; melt viscosity 6000 poises.
(2) Sold as Styron 475B by Dow Chemical Company: Vicat softening point 206°F, specific gravity 1.05; melt flow rate 3.6 gm/10 min.; melt viscosity 3400 poises.

All of these sheath compositions were successfully used to make pencils by the method and apparatus described below. When the sheath material is extruded to form the fine celled structure, it has a density ranging from 30 to 60 pounds per cubic foot.

Method of Forming Pencils

Figure 1:
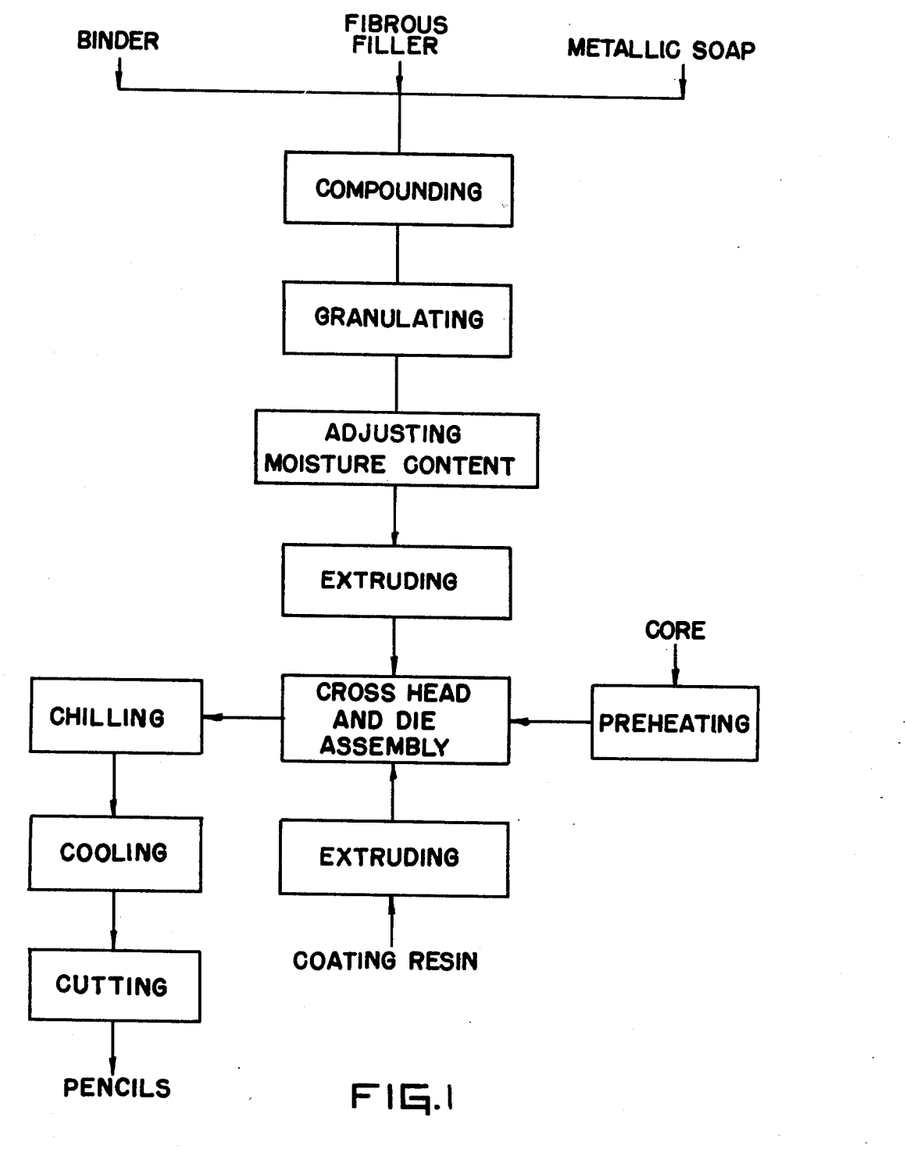
FIG. 1 is a flow diagram showing the steps in compounding the sheath material and in the formation of a pencil using the sheath material.

FIG. 1 is a flow diagram illustrating the steps of the method of this invention. Of the steps shown in FIG. 1, at least three are believed significant. These are the controlling of the moisture content in the sheath composition, the preheating of the lead cores and the quick chilling of the extrudate immediately after withdrawal from the die.

The marking core is preheated to a temperature which approximates that at which the sheath composition is introduced into the crosshead and die assembly and is extruded around the core. This temperature is in turn dependent upon the thermoplastic resin binder used, and is preferably at least about 100°F above the Vicat softening point of the resin. The marking core preferably is a lead; that is, a ceramic or vitrified element made by the well-known technique of firing a mixture of clay and graphite in the desired ratio. Since bonding of the sheath to the lead core is achieved without the use of an adhesive, the lead core is made so that it is free of any surface wax, the presence of which would interfere with bonding.

The sheath composition with its controlled moisture content is heated and forced under pressure through an extruder and caused to form a sheath of a prescribed thickness around the preheated core positioned along the axis of the sheath. The extrudate as it is withdrawn from the nozzle of the die immediately chilled by contacting its entire surface with expending, compressed air which strikes the extrudate surface in the form of a multiplicity of gas streams. These air streams are directed into the chilling zone toward the outlet end of the chiller to form an acute angle with the extrudate surface. The extrudate during this chilling step is supported by the die nozzle and by a cooling means which follows the chilling zone so that its entire surface is exposed to the compressed air. Subsequent to this chilling step, the extrudate is subjected to further cooling by indirect (and if desired direct) heat exchange with a fluid coolant until it reaches substantially ambient temperature throughout. Withdrawal of the extrudate from the die nozzle and through the chilling and cooling steps is accomplished by a degree of positive pulling which may be regulated automatically to ensure a uniform cross section in the extrudate. As a final step, the extrudate is cut into predetermined pencil lengths which may then be stamped with any desired indicia and equipped with an erasure assembly as is well known in the pencil making art.

The extrudate may be coated with a pigmented coating composition by coextruding a thermoplastic resin coating containing pigment in the form of a thin skin on it prior to its withdrawal from the die. The resin coating composition is heated above its softening point for coextrusion and is applied subsequent to the formation of the sheath. Suitable resins for coating include, but are not limited to, polystyrene, rubber-modified impact polystyrene resins, acrylonitrile-butadiene-styrene resins, styrene-acrylonitrile resins, acrylic resins, polyamide resins, cellulose-based resins, vinyl resins and the like. The coating resin must of course be one which has a working temperature which is within the temperature range at which the sheath is formed and be capable of forming a permanent bond with the sheath surface.

Figure 2:
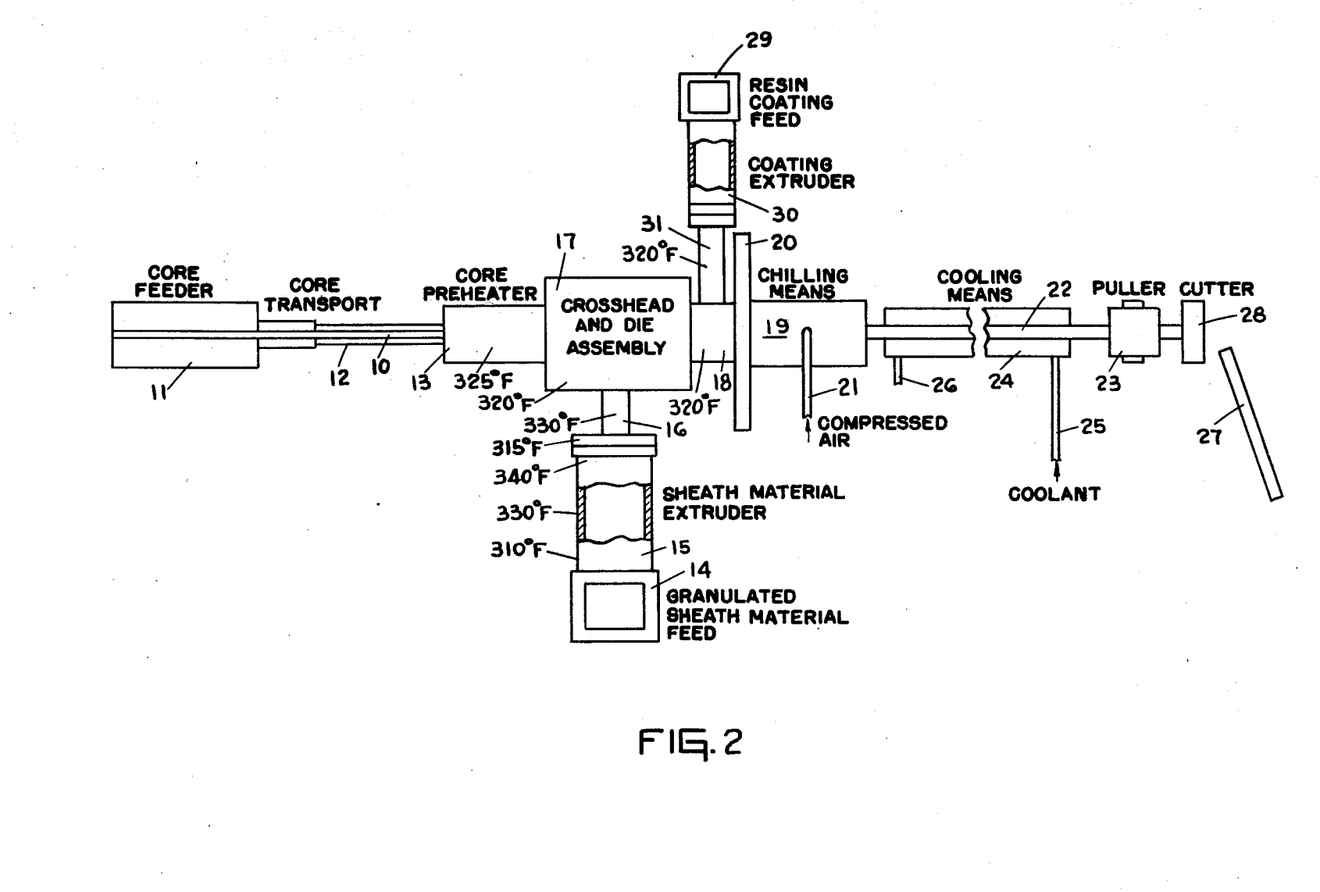
FIG. 2 is a simplified, top plan view of apparatus suitable for processing a sheath composition in accordance with the invention, this view further indicating an exemplary set of temperatures for one sheath composition at various zones of the apparatus.

FIG. 2, which is discussed in detail below, gives exemplary processing temperatures when using the composition of Example 1 as the sheath material and a colored styrene resin as the coating material. It will be seen that whereas the acrylonitrile butadiene-styrene resin used as the binder in the sheath composition is normally extruded at about 425°F, the sheath material of this invention containing the relatively high percentage of metallic soap is extruded at about 325°F.

Apparatus for Forming Pencils

The apparatus of this invention is shown in a simplified top plan view in FIG. 2. Details of the apparatus components are illustrated in FIGS. 3–16. As shown in FIG. 2, the lengths of the marking core 10 are supplied to and fed from a core feeder 11, moved along in abutting relationship by a core transport mechanism 12 intto a core preheater 13. The granulated sheath composition material is fed from a bin 14 into an extruder 15 through an inlet adapter line 16 and into a crosshead 17. It will be appreciated by those skilled in the art of extruding thermoplastic materials that suitable heating means (not shown) must be provided to establish the desired heating zones. Exemplary heaters are shown for the crosshead 17 in FIGS. 8 and 12 described below. Affixed to the end of a die 18 and thermally isolating it from chilling means 19 is a radiation shield 20, typically formed of a thermally insulating material such as asbestos board. Compressed air is provided to the chill means 19 through conduits 21, one of which is illustrated. The extrudate 22 is withdrawn from the die 18 by means of a puller 23, passing through the chilling means 19, through a cooling means 24, which is designed to effect indirect heat exchange between the extrudate and a coolant (e.g., tap water). The coolant is introduced into the cooling means 24 through an inlet line 25 and withdrawn through a discharge line 26. The extrudate is cut into pencil lengths 27 by a cutter 28. If the extrudate is to be coated by coextruding a thermoplastic resin skin coating on its surface, the coating resin is fed from supply means 29 into a coating extruder 30, through a die inlet adapter conduit 31 into the die 18. As in the case of the sheath extrusion means, suitable heating means (not shown) are provided for thee coating extruder. If not so coated, then the cut pencil lengths are coated in the same way as wood-sheathed pencils are coated.

Figure 3:
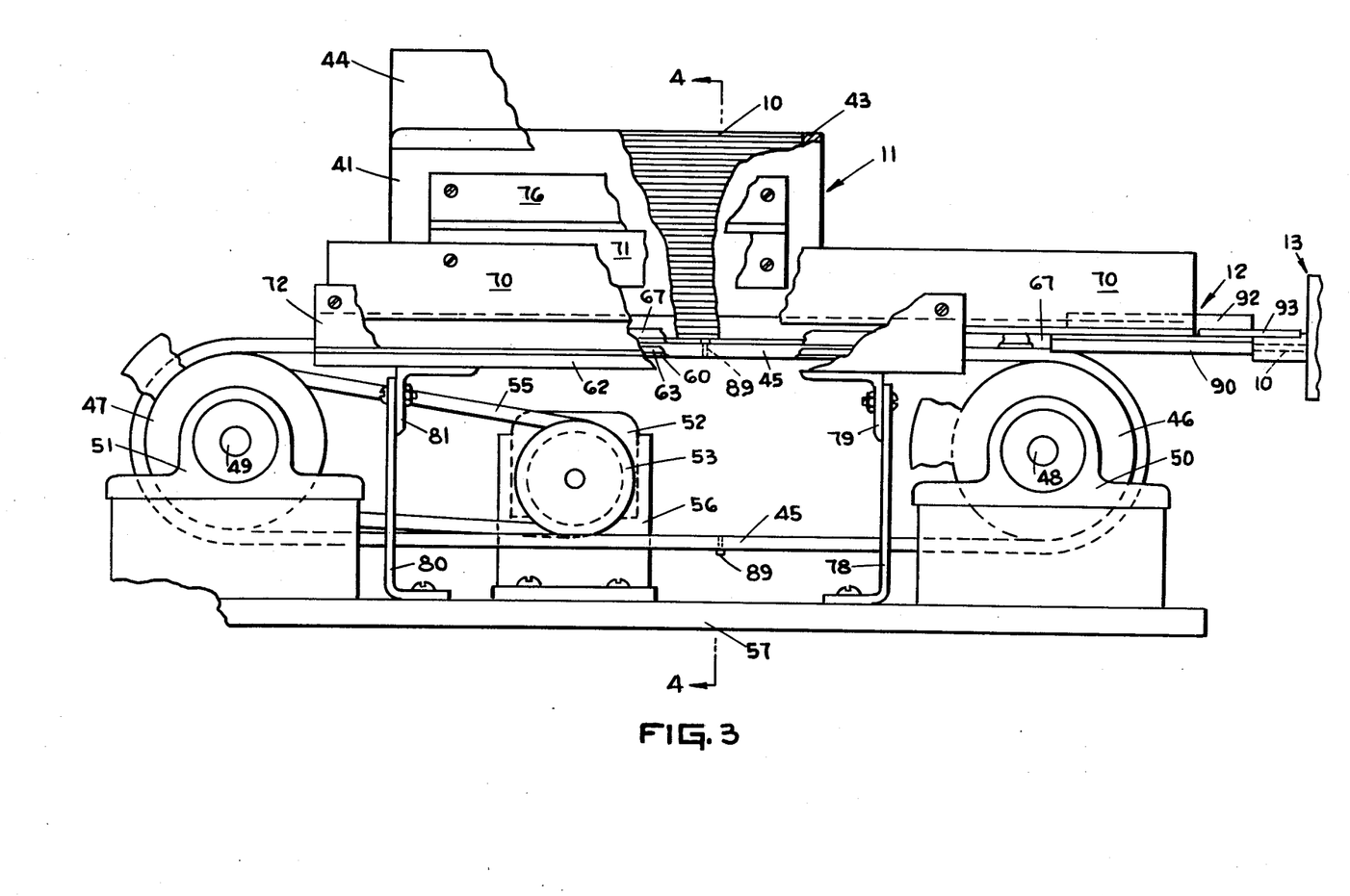
FIG. 3 is a side elevation, partly cut away, of the marking core feeding mechanism.
Figure 4:
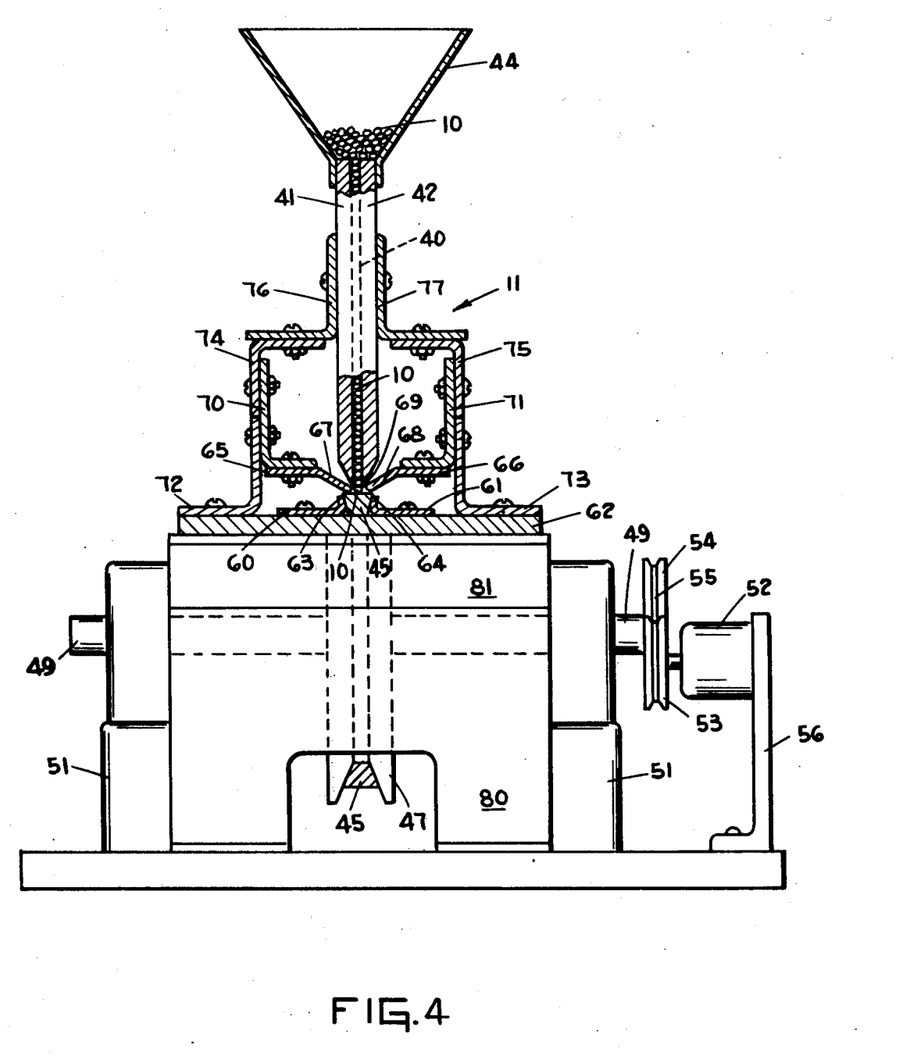
FIG. 4 is a vertical cross section taken approximately in the plane of line 4—4 of FIG. 3.

The core feeder 11 and core transport means 12 are shown in FIGS. 3 and 4. The cores are supplied in predetermined lengths 10 and are fed into the preheater, crosshead and die in abutting relationship to form, in essence, an endless or continuous, aligned core. The core lengths 10 are fed single through a vertical feeding passage 40 defined between two plates 41 and 42 closed at their ends by end members such as 43 and tapered at the delivery end. A core supply bin 44 provides the core lengths to the feeding passage 40.

The marking core lengths 10 are moved forward out of the feeder onto an endless V-belt 45 which engages a forward pulley system 46 and an after pulley system 47. These pulley systems are mounted on shafts 48 and 49, respectively, rotating in forward pillow blocks 50 and after pillow blocks 51. The after pulley system 47 is driven by motor 52 through drive pulleys 53 and 54 which are mechanically connected by belt 55. The pillow blocks 50 and 51 and the motor support 56 are all mounted on a base plate 57.

As the cores 10 are delivered to the V-belt, they are initially accurately aligned and maintained in alignment for delivery into the crosshead. Alignment is established and maintained within the feeder first through the alignment of belt 45 and then through alignment of the cores on the belt. As shown in FIGS. 3 and 4, alignment of the belt is maintained by causing it to travel between two aligning strips 60 and 61 affixed to a belt support plate 62. The inboard sides of these aligning strips are bent upwardly at an angle conforming to the contour of the sides of the belt to form belt guides 63 and 64 which are spaced to define a passage just large enough to permit the belt to travel through the passage with a minimum amount of friction. Alignment of the cores on the belt is achieved through the use of core aligning strips 65 and 66, the inboard sides 67 and 68 of which are bent downwardly to form an elongated lead core passage 69 directly beneath lead core feed passage 40. This elongated passage 69 is bounded on its upper side by the exit of passage 40 and on its lower side by the surface of belt 45. The aligning strips 65 and 66 are mounted on angled support strips 70 and 71 which in turn are adjustably mounted on lower angled supports 72 and 73, affixed to belt support plate 62, and to upper angled supports 74 and 65. These latter, upper supports 74 and 75 in turn form the means by which the two plates 41 and 42 defining passage 40 are supported, through angled strips 76 and 77, above the belt. This entire support system is adjustable with regard to distance from the core axis as well as to height above the belt support plate 62.

The belt support plate 62, along with the support assembly affixed to it, is adjustably positioned above base plate 57 by means of forward angled support plates 79 and 81 and after angled support plate 78 and 80 which are apertured to permit the passage of belt 45.

As previously stated, it is necessary to advance the core lengths 10 in abutting relationship. The advancement of the cores is accomplished by means of a series of pusher feet 89 mounted at equally spaced intervals along the center line of the belt, the intervals being equivalent to the length of the individual lead cores plus a small clearance. These pusher feet also control the discharge of a core length onto the belt, for as long as one of these pusher feet is traveling under the exit of passage 40 in the feeder, it is not possible for the core at the exit of passage 40 to fall completely onto the belt. As soon, however, as a pusher foot 89 (e.g., the one shown in FIG. 3) passas beyond the forward end of the passage exit, the next core falls into place and a pusher foot makes contact with its after end. A positive force is required to move the cores forward to overcome the resistance provided in the crosshead as the extruded sheath composition contacts the cores. This positive force is provided by the pusher feet 89. The gap between consecutive core lengths is eliminated by providing the motor 52 with a slip clutch mechanism which allows the belt 45 to move faster when it is not actually pushing a core length. Thus each core length "catches up" with the one ahead of it which, as explained, experiences a backward thrust.

Figure 5:
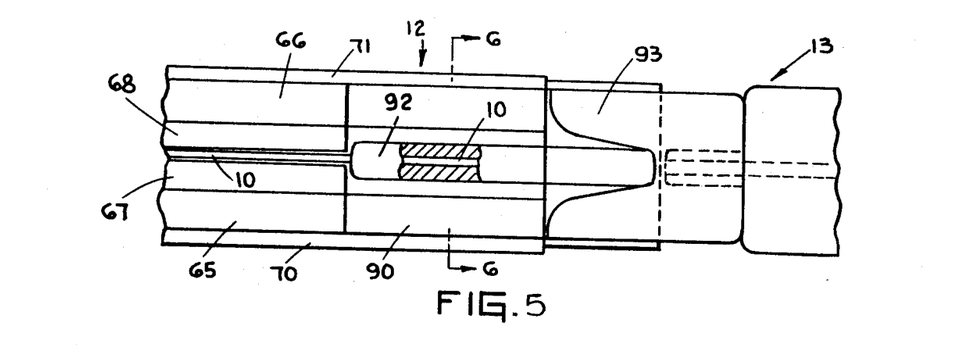
FIG. 5 is a top plan view of the core transport system.
Figure 6:
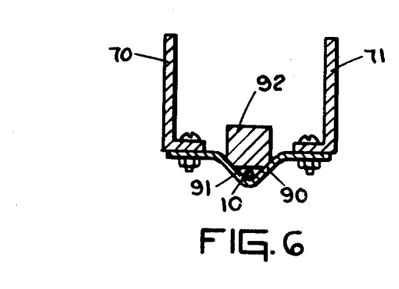
FIG. 6 is a vertical cross section taken approximately in the plane of line 6—6 of FIG. 5.

The core transport mechanism 12 between the feeder 11 and preheater 13 is shown in FIGS. 3, 5 and 6. The angled support strips 70 and 71 extend beyond the belt 45, while the core alignment strips 65 and 66 extend to that point where the belt contacts the pulley 46. The angled support strips 70 and 71, beyond the effective length of belt 45 serve to support a trough 90 (FIG. 6) which is aligned with belt 45 and designed to provide a passage 91 for the core 10. Passage 91 is enclosed on top by a solid metal bar 92 which is cut to fit the sides of the trough and adapted to sit in it without touching the lead cores. This bar prevents any buckling of the core lengths where they abut. The trough 90 and the entry end of the core preheater are joined by a cover plate 93 serving in the same role as the solid bar 92. At this point, the core is introduced into the preheater.

Figure 7:
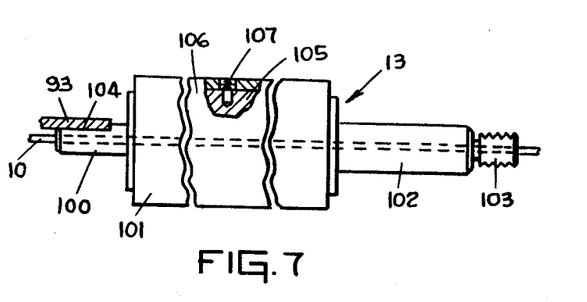
FIG. 7 is a side elevation, partly cut away and in cross section, of the core preheater.
Figure 8:
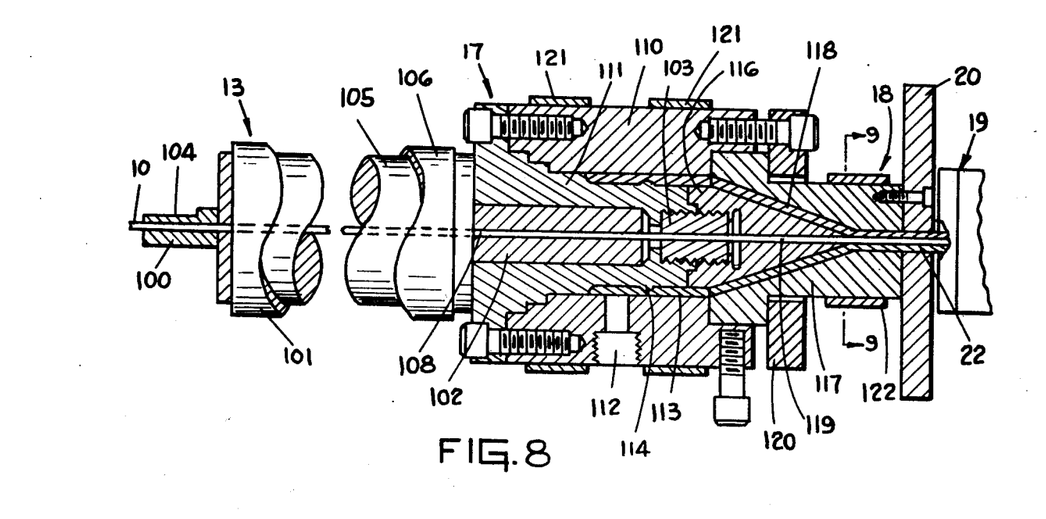
FIG. 8 is a vertical cross section of one embodiment of a crosshead and die assembly and its relationship with the core preheater.

The core preheater 13, as shown in FIGS. 7 and 8, is formed in four sections: a small diameter entry section 100, a larger diameter heater section 101, an adapter section 102 and a threaded section 103. The top of the entry section 100 is partially cut away to provide a flat surface 104 for engagement with cover plate 93 of the core transport system. The heater section comprises a cylindrical thermal mass of metal 105 (typically formed of steel or copper) and a band resistance heater 106 in thermal contact with substantially all of its surface. A thermocouple well 107 is located in the thermal mass 105. It is, of course, within the scope of this invention to use other types of heaters and other types of temperature measuring devices if desired. A passage 108, having a diameter slightly greater than the diameter of the core, extends throughout the length of the preheater.

One embodiment of the crosshead and die assembly is shown in cross section in FIG. 8. In keeping with well known crosshead design practice, the crosshead used in this apparatus comprises a crosshead body formed of a male section 110 and a female section 111. The male section has a threaded well 112 adapted to be connected to the threaded conduit adapter 16 of the sheath material extruder (FIG. 2) to provide the necessary communication with the annular extrusion passage 113 defined between the male and female sections. The female section is designed to provide a circumferential ridge 114, the purpose of which is to ensure uniform distribution of the thermoplastic sheath composition material 115 (FIG. 9) around and throughout passage 113. A cone 116 is attached, such as by screw means, to the preheater extending through the female section. The cone extends into the die 117, forming therewith a passage 118 which is a continuation of passage 113.

The cone 116 has a core passage 119 aligned with passage 108 in the preheater. This passage 119 and the conical passage 118 converge in the after end of the die at the point where the sheath material is extruded around and bonded to the core forming the extrudate 22. The crosshead sections and the die, including the crosshead clamp 120, are assembled by suitable means such as screws, as illustrated in FIG. 8. Two band resistance heaters 121 are affixed to the outer surface of crosshead 17 and another band heater 122 is affixed to the outer surface of die 117. The apertured radiation shield 20 interposed between the heated die section 18 and the chilling means 19 is attached to the end of the die.

Figure 9:
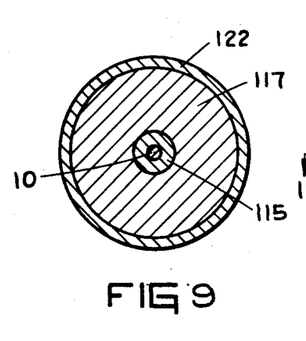
FIG. 9 is a cross section taken approximately in the plane of line 9—9 of FIG. 8.
Figure 10:
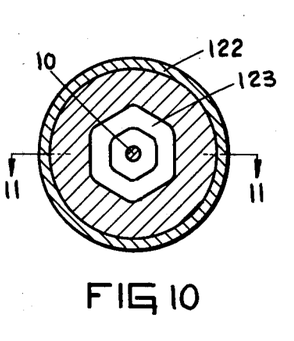
FIG. 10 is a cross section of another embodiment of a portion of the die showing a hexagonal-shaped die as an alternative to the circular die of FIG. 9.
Figure 11:
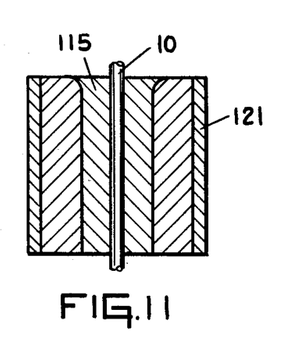
FIG. 11 is a cross section taken approximately in the plane of line 11—11 of FIG. 10.

As shown in FIGS. 8 and 9, the extrudate 22 (core 10 surrounded by sheath material 115) is circular in cross section. It is also within the scope of this invention to form the extrudate in any other desirable cross section, e.g., hexagonal. This latter configuration is illustrated in FIGS. 10 and 11. In FIG. 10, the die opening 123 is shown without the sheath material while in FIG. 11 the sheath 115 is shown around the core 10.

Figure 12:
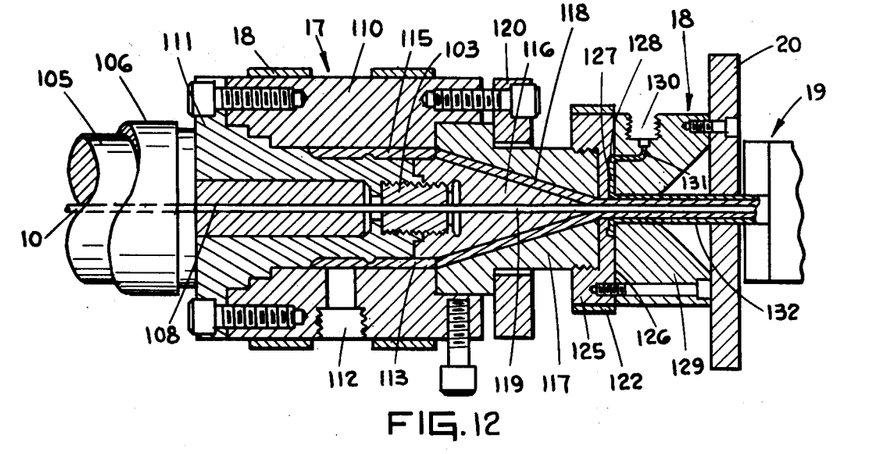
FIG. 12 is a vertical cross section of another embodiment of the crosshead and die assembly which includes means to apply a coating to the outside surface of the sheath.

FIG. 12 illustrates another embodiment of the crosshead and die assembly, this embodiment being adapted to coextrude a skin coating around the sheath. The main crosshead is the same as shown in FIG. 8. The die assembly is modified to have an additional crosshead and die attached thereto, as by threading it onto the end of die 117. This second crosshead and die comprise a threaded adapter piece 125 which has machined in its face 126 a shallow circular well 127 bordered by a somewhat deeper ring 128, the well and ring forming with die block 129 a portion of the passage through which the thermoplastic resin coating material is introduced into the die. The circular well 127 is located so that its center does not coincide with the aperture in adapter 125, thus ensuring uniform distribution of the resin prior to and during its contacting the exterior surface of the sheath. The die block 129 has a threaded well 130 which is adapted for attachment to adapter conduit 31 of the coating extruder 30 (FIG. 2). This well is in communication with ring 128 through passage 131. The die opening in die block is sized to permit the formation of a coating 132 of a predetermined thickness to be coextruded around the sheath to form the extrudate. In this embodiment of the invention, the radiation shield 20 is bolted to die block 129.

Figure 13:
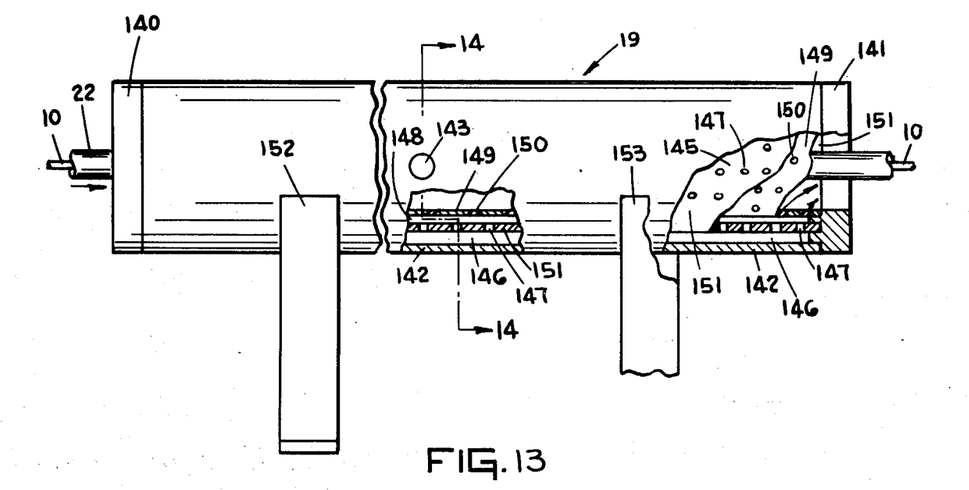
FIG. 13 is a side elevation, partly cut away and in cross section, of the chilling means.
Figure 14:
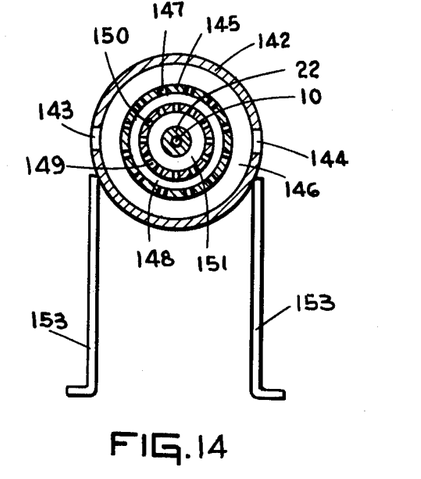
FIG. 14 is a cross section taken approximately in the planes of lines 14—14 of FIG. 13.

One means for effecting the required rapid chilling is illustrated in FIGS. 13 and 14. It provides means for contacting the entire surface of the extrudate with cooled expanded high-pressure air to give the hot extrudate a smooth surface and to impart to the sheath a radial density gradient. This chilling means comprises three concentric lengths of tubing, typically about three feet long held in spaced relationship by means of annular spacing rings 140 and 141. The outer tubing 142 has two air inlet ports 143 and 144 opposite each other and located at about the center of its length. These are adapted to receive compressed air from air inlet lines 21 (FIG. 2). The first inner tubing 145 defines an annular air flow passage 146 with the outer tubing, and it is perforated to provide a number of fluid ports 147 communicating with the innermost annular passage 148 defined between the first inner tubing 145 and a second inner tubing 149. The second inner tubing has a number of fluid ports 150 positioned to be staggered from the fluid ports 147. The fluid ports 150 are cut at an angle to cause the air entering the chilling zone 151 (defined within the second inner tubing) in the forming of a multiplicity of streams directed into the chilling zone toward the outlet end of the chiller at an acute angle with the extrudate surface as indicated by the arrows in FIG. 13. The annular passages 146 and 148 are sealed at the ends by the annular spacing rings 140 and 141. The chiller is conveniently supported by two pairs of legs 152 and 153.

Figure 15:
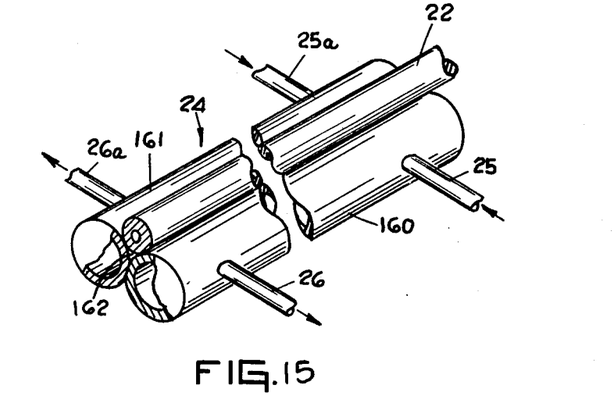
FIG. 15 is a perspective view, partly in cross section, of the cooling means.
Figure 16:
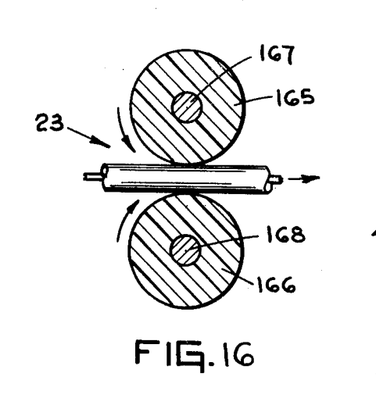
FIG. 16 is a view of the pulling means.

From the chiller 19, the extrudate passes to the cooling means 24 of extended length, typically about forty feet, adapted to effect indirect heat exchange with a fluid coolant, such as tap water. As shown in FIG. 15, the cooling means comprises two end-sealed lengths of copper tubing 160 and 161 soldered together and having a fillet 162 formed of a good heat conducting material contoured to contact a part of the surface of the extrudate 22. The coolant is delivered to the forward end of each of the tubings through inlet conduits 25 and 25a and withdrawn at the after end through discharge conduits 26 and 26a. Final additional cooling, if desired, may be effected by directly contacting the extrudate surface with a fluid coolant, e.g., one or more fine streams of water or air.

It is necessary to exert a pulling force on the extrudate to ensure an even cross section throughout. This pulling force may be developed by a number of different types of equipment known in the art, the puller 23 shown in FIG. 16 comprising two hard rubber rolls 165 and 166 mounted on shafts 167 and 168. One of the shafts is driven by any suitable means not shown. It may be desirable to automatically control the speed of the shaft driving means to control and regulate the extrudate diameter.

The cutter 28 (FIG. 2) may be chosen from commercially available devices; and it is preferably one that advances as it cuts the forward moving extrudate so that it forms a perfectly square cut. Such cutters are known.

Completed Article of Manufacture

Figure 17:
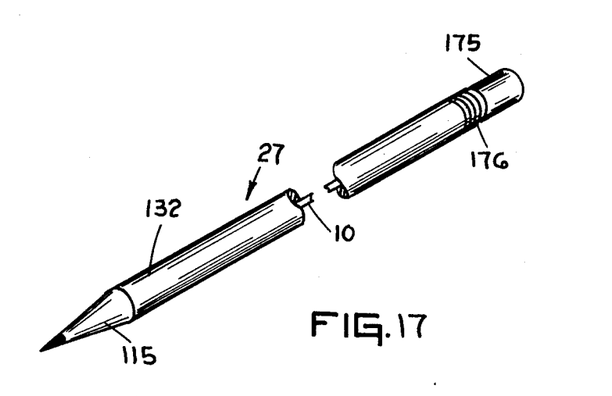
FIG. 17 illustrates a pencil made in accordance with this invention.
Figure 18:
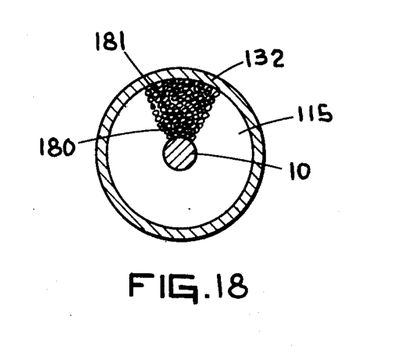
FIG. 18 is an enlarged cross section of the pencil shown in FIG. 17.

The cut lengths 27 of the extrudate may have erasers 175 attached through metal sleeves or ferrules 176 (FIG. 17) to be formed into pencils. The pencils made by the method and apparatus of this invention are readily sharpenable in a mechanical pencil sharpener as well as with a penknife. The outer surface, whether coated or not, is smooth and can be printed on using the same techniques which are presently used for all-wood sheathed pencils. The actual sheath structure of the pencils is unique in that it may be seen in cross section to be formed of finely sized, closed cells. This structure is illustrated in a diagrammatic, not-to-scale drawing in FIG. 18. The cells 180 nearer the center are typically about 70 microns in diameter, while those cells 181 around the outer edge are subsantially closed or not greater than about 10 microns in diameter. The larger cells may have diameters up to about 100 microns. The cell diameter gradient decreases radially outward to furnish a density gradient which increases radially outward. It may be postulated that the denser outer surface 181 providing the smooth surface of the extrudate, together with the internal cell structure, is due to the controlled amount of moisture, to the use of the metallic soap, and to the rapid chilling of the extrudate as it exits from the die. As shown, the extrudate is provided with the skin coating 132.

It is believed that the advantages and improved results afforded by the sheath composition, method and apparatus for making pencils, and the resultant product of invention will be apparent from the foregoing detailed description. Various modifications and changes may be made without departing from the spirit and scope of the invention as set forth in the following claims.

We claim:

1. A method of making a sheathed marking core wherein the sheath is cellular comprising providing a composition consisting essentially of, by weight, approximately 50 to 75% of an extrusion grade thermoplastic resin binder having a Vicat softening point above about 180°F, approximately 20 to 40% of a fibrous filler selected from the group consisting of cellulose and leather, the binder/filler ratio being approximately 1.5 to 3.0, and approximately 0.5 to 15% of a metallic soap, the composition having a moisture content of approximately 0.3 to 2%, extruding a sheath of said composition around a marking core, and cooling the resulting extrudate.

2. A method according to claim 1 wherein the marking core is preheated to a temperature of at least 100°F. above the Vicat softening point of the thermoplastic resin binder; and wherein the composition is extruded about the marking core at a temperature substantially the same as the preheated temperature of the core.

3. A method according to claim 1 wherein the core comprises a plurality of core lengths of substantially equal size in end to end, abutting relation.

4. A method according to claim 1 including coextruding a resin coating upon the sheathed core.

5. A method according to claim 1 wherein cooling the resulting extrudate comprises rapidly chilling the extrudate followed by further cooling.

6. A method according to claim 5 wherein the rapid chilling comprises directing a multiplicity of streams of a gas coolant at an acute angle against the surface of the sheath as the resultant extrudate is advanced.

7. A method in accordance with claim 1 wherein the thermoplastic resin binder is approximately 70% of an acrylonitrile-butadiene-styrene resin; the fibrous filler is approximately 25% wood flour; wherein the metallic soap is aluminum stearate in the amount of approximately 5%; wherein the moisture content of the composition is approximately 0.8 to 1%; wherein the marking core is preheated to a temperature of at least 100°F. above the Vicat softening point of the thermoplastic resin binder and the composition is extruded about the marking core at a temperature substantially the same as the preheated temperature of the core; and wherein cooling the resulting extrudate comprises rapidly chilling the extrudate followed by further cooling.

* * * * *